United States Patent
Yeager et al.

(10) Patent No.: US 7,964,697 B2
(45) Date of Patent: *Jun. 21, 2011

(54) POLYARYLETHER MEMBRANES

(75) Inventors: Gary William Yeager, Rexford, NY (US); Daniel Steiger, Bedminster, NJ (US); Yanshi Zhang, Shaker Heights, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,252

(22) Filed: Aug. 13, 2008

(65) Prior Publication Data

US 2010/0041853 A1    Feb. 18, 2010

(51) Int. Cl.
   *C08G 6/00*   (2006.01)
(52) U.S. Cl. ........ 528/220; 528/422; 528/423; 528/125; 528/174
(58) Field of Classification Search ................... 525/205, 525/373, 425; 210/500.36; 528/422, 423
   See application file for complete search history.

(56) References Cited

U.S. PATENT DOCUMENTS

| | | | |
|---|---|---|---|
| 3,251,806 A | 5/1966 | Parker | |
| 4,051,300 A | 9/1977 | Klein et al. | |
| 4,361,484 A | 11/1982 | Larsson et al. | |
| 4,663,427 A | 5/1987 | Matsuo et al. | |
| 4,961,852 A | 10/1990 | Pemawansa et al. | |
| 5,071,448 A | 12/1991 | Bikson et al. | |
| 5,076,935 A | 12/1991 | Kraus et al. | |
| 5,114,585 A | 5/1992 | Kraus et al. | |
| 5,158,721 A | 10/1992 | Allegrezza, Jr. et al. | |
| 5,178,765 A | 1/1993 | Hu et al. | |
| 5,807,944 A | 9/1998 | Hirt et al. | |
| 5,911,880 A | 6/1999 | Klein et al. | |
| 6,051,661 A | 4/2000 | Weber et al. | |
| 6,214,382 B1 | 4/2001 | Eguchi et al. | |
| 7,098,266 B2 | 8/2006 | Weber et al. | |
| 7,393,914 B2 | 7/2008 | Moore et al. | |
| 7,547,756 B2 | 6/2009 | Hung et al. | |
| 2002/0147282 A1 | 10/2002 | Mayes et al. | |
| 2004/0026314 A1 | 2/2004 | Kobayashi et al. | |
| 2005/0037132 A1 | 2/2005 | Horres et al. | |
| 2005/0064038 A1 | 3/2005 | Dinh et al. | |
| 2005/0069780 A1 | 3/2005 | Kinouchi et al. | |
| 2006/0138044 A1 | 6/2006 | Krause et al. | |
| 2006/0264355 A1 | 11/2006 | Storr et al. | |
| 2007/0112169 A1 | 5/2007 | Brunelle et al. | |
| 2007/0112170 A1 | 5/2007 | Brunelle et al. | |
| 2007/0142613 A1 | 6/2007 | Hung et al. | |
| 2007/0142614 A1 | 6/2007 | Hung et al. | |
| 2007/0238856 A1 | 10/2007 | Moore et al. | |
| 2008/0004443 A1 | 1/2008 | Brunelle et al. | |
| 2008/0114149 A1 | 5/2008 | Moore et al. | |
| 2008/0114183 A1 | 5/2008 | Moore et al. | |
| 2008/0135481 A1 | 6/2008 | Steiger et al. | |
| 2008/0142418 A1 | 6/2008 | Zhang et al. | |
| 2008/0142429 A1 | 6/2008 | Zhang et al. | |
| 2008/0203012 A1* | 8/2008 | Yeager et al. | 210/500.36 |

FOREIGN PATENT DOCUMENTS

| | | |
|---|---|---|
| DE | 19961040 A1 | 6/2001 |
| EP | 855428 A1 | 7/1998 |
| EP | 855429 A1 | 7/1998 |
| EP | 855430 A2 | 7/1998 |
| WO | 00/54103 A1 | 9/2000 |
| WO | 2003046080 A1 | 5/2003 |

OTHER PUBLICATIONS

Weber, Martin in Situ Polyamide d/polysulfone-alloys. 59th Annual Technical Conference—Society of Plastics Engineers 2001, vol. 2 pp. 2222-2226.

Charonensirisomboon, P., Inoue, et al., Pull-out Copolymer in Situ-Formed During Reactive Blending:Effect of the Copolymer Architecture. Polymer 2000, vol. 41, pp. 6907-6912.

Koch, Thomas; Ritter, Helmut. Functionalized Polysulfones from 4-4-bis (4-hydroxyphenyl) Pentanoic Acid, 2-2,Isopropylidendiphenol and Bis(4-chlorophenyl) Sulfone: Synthesis, Behavior and Polymer Analogous Amidation of the Carboxylic Groups. Macromolecular Chemistry and Physics 1994, vol. 195 pp. 1709-1717.

Esser, Isabelle C.H. M.; Parsons, Ian W., Modified Poly(ether ether sulfone) Polymers: Approaches to Pendant Carboxyl Groups. Polymer 1993, vol. 34, pp. 2836-2844.

Rodewald, B; Ritter, H. Oligo (ether sulfones). 3 Block Copolymers via Condensation Reactions of Telechelic Oligo (ether sulfones) Bearing Phenolic Endgroups and Oligimeric a,w-Diols.m Macromolecules 1999, vol. 32, pp. 1679-1700.

Ritter, H., Rodewald, B., 1. Functionalized Oligo (ether-sulfones) from 4,4-bis(4-hydroxyphenyl) Pentanoic Acid and bis (4-chlorophenyl) Sulfone: Synthesis, Properties, and Substitution of the Chlorophenyl Endroups. Macromolecular Reports 1996 A 33 Suppl. 2, pp. 103-115.

Waring, Derek M.H., Polyarlene Ether Ionomers. Defensive Publication U.S. Patent Office 1971.

U.S. Appl. No. 12/191,211, filed Aug. 13, 2008, Gary William Yeager.

U.S. Appl. No. 12/191,236, filed Aug. 13, 2008, Gary William Yeager.

\* cited by examiner

*Primary Examiner* — Randy Gulakowski

*Assistant Examiner* — Shane Fang (74) *Attorney, Agent, or Firm* — Catherine J. Winter; Gary M. Hartman; Domenica N. S. Hartman (57) ABSTRACT

A membrane including a polyarylether having amide functionality. The polyarylether having amide functionality includes units from at least one of structure I or structure II:

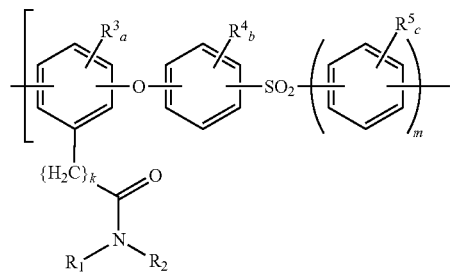

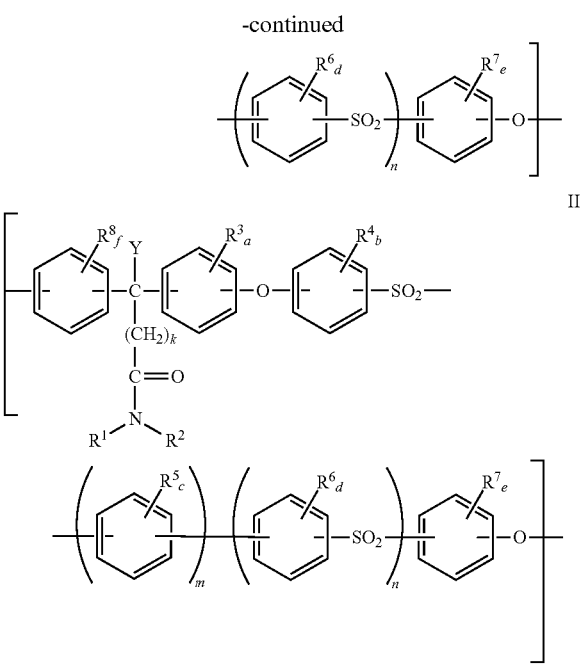

$R_1$ and $R_2$ are separate groups or are covalently connected to form a cyclic moiety; $R_1$ and $R_2$ are each, independently, hydrogen, $C_{1-20}$ alkyl, $C_3$-$C_{30}$ aryl or a substituted $C_{3-30}$ aryl; $R^3$, $R^4$, $R^5$, $R^6$, $R^7$ and $R^8$ are each, independently, a nitro group, $C_1$-$C_{12}$ alkyl, $C_3$-$C_{30}$ aryl or a combination; Y is hydrogen, $C_{1-20}$ alkyl or $C_3$-$C_{30}$ aryl; k is from about 0 to about 10; a, b, c, d, e and f are each, independently, 0, 1, 2, 3 or 4; and m and n are each, independently, 0 or 1.

19 Claims, 1 Drawing Sheet

POLYARYLETHER MEMBRANES

FIELD OF THE INVENTION

The invention relates generally to hydrophilic membranes, and more particularly, to hydrophilic polyarylether membranes.

BACKGROUND OF THE INVENTION

Liquid filtration membranes for aqueous media may be in hollow fiber or flat sheet configurations and must be porous, hydrophilic, have excellent mechanical properties to support the membrane during manufacture and use and must have adequate thermal properties to prevent the membrane from degrading during high temperature processes. Furthermore, these membranes must have nonspecific protein binding, such that membrane fouling is minimized. Membrane fouling is a major concern, resulting in reduced efficiency due to flux decline, high cleaning and maintenance costs and low membrane lifetimes.

Typical membrane materials are hydrophobic and require an additive to make the membrane more hydrophilic. Polysulfones have the mechanical and thermal properties necessary for liquid filtration membranes, but these polymers are insufficiently hydrophilic. To improve their hydrophilicity, polysulfones have been blended with hydrophilic polymers, such as polyvinylpyrollidone (PVP). However, PVP is water-soluble and is slowly leached from the porous polymer matrix creating product variability.

Thus, hydrophilic porous membranes possessing excellent thermal, mechanical properties and improved fouling resistance are desired for longer service lifetimes.

SUMMARY OF THE INVENTION

In one embodiment, a membrane comprises a polyarylether having amide functionality comprising units from at least one of structure I or structure II:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1.

The various embodiments provide membranes comprising polyarylethers having amide functionality that are hydrophilic and have good mechanical and thermal properties with improved fouling resistance. The polyarylether having amide functionality is hydrophilic, but is not water soluble and will not leach out of the membrane.

DETAILED DESCRIPTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, it is intended that values such as 15 to 85, 22 to 68, 43 to 51, 30 to 32, etc. are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, a membrane comprises a polyarylether having amide functionality comprising units from at least one of structure I or structure II:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1.

In one embodiment, R1 and/or R2 may be methyl, ethyl, propyl, isopropyl, butyl, hexyl, heptyl, octyl, 4-methylpent-1-yl, phenyl, naphthyl or biphenyl. In another embodiment, R1 and R2 are covalently connected to form a cyclic moiety. In one embodiment, R1 and R2 form a cycloalkyl group. In another embodiment, R1 and R2 form a cyclohexyl group.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is about 0 to about 5. In another embodiment, k is from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In one embodiment, the polyarylether having amide functionality comprises units of structure III:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl; and k is from about 0 to about 10.

In one embodiment, R1 and/or R2 may be methyl, ethyl, propyl, isopropyl, butyl, hexyl, heptyl, octyl, 4-methylpent-1-yl, phenyl, naphthyl or biphenyl. In another embodiment, R1 and R2 are covalently connected to form a cyclic moiety. In one embodiment, R1 and R2 form a cycloalkyl group. In another embodiment, R1 and R2 form a cyclohexyl group.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is in a range of from about 0 to about 5. In another embodiment, k is in a range of from about 1 to about 3.

The polyarylethers having amide functionality are hydrophilic, but are not water soluble. They are solvent resistant polymers with a high glass transition temperature. In one embodiment, the glass transition temperature, $T_g$, of the polymer ranges from about 120° C. to about 280° C. In another embodiment, the polymer ranges from about 140° C. to about 250° C. In another embodiment, the $T_g$ ranges from about 140° to about 225° C., including from about 175° C. to about 225° C.

The polyarylether having amide functionality may be characterized by number average molecular weight ($M_n$) and weight average molecular weight ($M_w$). The various average molecular weights $M_n$ and $M_w$ are determined by techniques, such as gel permeation chromatography, and are known to those skilled in the art. In one embodiment, the $M_n$ of the polymer is in the range from about 10,000 g/mol to about 1,000,000 g/mol. In another embodiment, the $M_n$ ranges from about 15,000 g/mol to about 200,000 g/mol. In another embodiment, the $M_n$ ranges from about 20,000 g/mol to about 100,000 g/mol. In another embodiment, the $M_n$ ranges from about 40,000 g/mol to about 80,000 g/mol. In one embodiment, the $M_w$ of the polymer is in the range from about 10,000 g/mol to about 5,000,000 g/mol. In another embodiment, the $M_w$ ranges from about 15,000 g/mol to about 1,000,000 g/mol. In another embodiment, the $M_w$ ranges from about 20,000 g/mol to about 500,000 g/mol. In another embodiment, the $M_n$ ranges from about 40,000 g/mol to about 400,000 g/mol.

The polyarylether having amide functionality may be prepared by reacting a dihydroxyaromatic compound having amide functionality with a dihaloaromatic sulfone or a dinitroaromatic sulfone in the presence of a base.

The dihydroxyaromatic compounds having amide functionality are dihydroxyaromatic compounds where at least one hydrogen is replaced by a functional group containing an amide group. Examples of dihydroxyaromatic compounds include, but are not limited to, bis(4-hydroxyphenyl)sulfide, bis(4-hydroxyphenyl)ether, bis(4-hydroxyphenyl)sulfone, bis(4-hydroxyphenyl)sulfoxide, 4,4'-(phenylphosphinyl)diphenol, 5-cyano-1,3-dihydroxybenzene, 4-cyano-1,3-dihydroxybenzene, 2-cyano-1,4-dihydroxybenzene, 2-methoxyhydroquinone, 2,2'-dimethylbiphenol, 2,2',6,6'-tetramethylbiphenol, 2,2',3,3',6,6'-hexamethylbiphenol, 3,3',5,5'-tetrabromo-2,2',6,6'-tetramethylbiphenol, 2,2-bis(4-hydroxyphenyl)hexafluoropropane, 4,4'-(3,3,5-trimethylcyclohexylidene)diphenol, 1,1-bis(4-hydroxy-3-methylphenyl)cyclohexane, 4,4-bis(4-hydroxyphenyl) heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,2-bis(4-hydroxyphenyl)ethane, 1,1-bis(4-hydroxy-2-chlorophenyl)ethane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,2-bis(4-hydroxyphenyl)butane, 2,2-bis(4-hydroxyphenyl)-2-methylbutane, 1,1-bis(4-hydroxyphenyl)cyclohexane, 2-(3-methyl-4-hydroxyphenyl-2-(4-hydroxyphenyl)propane, 2-(3,5-dimethyl-4-hydroxyphenyl)-2-(4-hydroxyphenyl) propane, 2-(3-methyl-4-hydroxyphenyl)-2-(3,5-dimethyl-4-hydroxyphenyl)propane, bis(3,5-dimethylphenyl-4-hydroxyphenyl)methane, 1,1-bis(3,5-dimethylphenyl-4-hydroxyphenyl)ethane, 2,2-bis(3,5-dimethylphenyl-4-hydroxyphenyl)propane, 2,4-bis(3,5-dimethylphenyl-4-hydroxyphenyl)-2-methylbutane, 3,3-bis(3,5-dimethylphenyl-4-hydroxyphenyl)pentane, 1,1-bis(3,5-dimethylphenyl-4-hydroxyphenyl)cyclopentane, 1,1-bis(3,5-dimethylphenyl-4-hydroxyphenyl)cyclohexane, bis(3,5-dimethyl-4-hydroxyphenyl)sulfoxide, bis(3,5-dimethyl-4-hydroxyphenyl)sulfone, bis(3,5-dimethylphenyl-4-hydroxyphenyl)sulfide, 2-carbamoylhydroquinone, 2,3-dicarbamoylhydroquinone, 2,2-bis(4-hydroxyphenyl) propane (bisphenol-A), resorcinol, catechol, hydroquinone, 2,6-dihydroxy naphthalene, 2,7-dihydroxynapthalene, 2,4'-dihydroxyphenyl sulfoxide, 2-diphenylphosphinylhydroquinone, bis(2,6-dimethylphenol) 2,2'-biphenol, 4,4'-biphenol, 4,4'-bis(3,5-dimethyl)biphenol, 4,4'-bis(2,3,5-trimethyl) biphenol, 4,4'-bis(2,3,5,6-tetramethyl)biphenol, 4,4'-bis(3-bromo-2,6-dimethyl)biphenol, 4,4'-isopropylidenebis(2,6-dibromophenol) (tetrabromobisphenol A), 4,4'-isopropylidenebis(2,6-dimethylphenol) (tetramethylbisphenol A), 4,4'-isopropylidenebis(2-methylphenol), 4,4'-isopropylidenebis(2-allylphenol), 4,4'-isopropylidenebis(2-allyl-6-methylphenol), 4,4'-isopropylidene-bis(2-phenylphenol), 4,4'(1,3-phenylenediisopropylidene)bisphenol (bisphenol M), 4,4'-(1,4-phenylenediisoproylidene)bisphenol (bisphenol P), 4,4'-sufonylbis(2,6-dimethylphenol), 4,4'-hexafluoroisopropylidene)bisphenol (Bisphenol AF), 4,4'-hexafluoroisopropylidene) bis(2,6-dimethylphenol), 4,4'(1-phenylethylidene)bisphenol (Bisphenol AP), 4,4'-(1-phenylethylidene) bis(2,6-dimethylphenol), 3,3-(4-hydroxyphenyl)pentane, bis (4-hydroxyphenyl)-2,2-dichloroethylene (Bisphenol C), bis (2,6-dimethyl-4-hydroxyphenyl)methane, 4,4'-(cyclopentylidene)diphenol, 4,4'-(cyclohexylidene)bis(2-methylphenol), 4,4'-bis(4-hydroxyphenyl)diphenyl ether, 9,9-bis(3-methyl-4-hydroxyphenyl)fluorene, N-phenyl-3,3-bis-(4-hydroxyphenyl)phthalimide, 4,4'-(cyclododecylidene)diphenol, 4,4'-(bicyclo[2.2.1]heptylidene)diphenol, 4,4'-(9H-fluorene-9,9-diyl)diphenol, 3,3-bis(4-hydroxyphenyl)isobenzofuran-1 (3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(2-methylphenol) or dicyclopentadienyl bisphenol.

In one embodiment, the dihydroxyaromatic compounds having amide functionality have the structure IV or V:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

k is from about 0 to about 10;

Y is hydrogen, $C_1$-$C_{20}$ alkyl or $C_3$-$C_{30}$ aryl;

$Ar_1$ and $Ar_2$ are each, independently, a $C_3$-$C_{30}$ aryl group, a $C_3$-$C_{30}$ aromatic-aliphatic group or a substituted $C_3$-$C_{30}$ aryl group.

In one embodiment, R1 and/or R2 may be methyl, ethyl, propyl, isopropyl, butyl, hexyl, heptyl, octyl, 4-methylpent-1-yl, phenyl, naphthyl or biphenyl. In another embodiment, R1 and R2 are covalently connected to form a cyclic moiety. In one embodiment, R1 and R2 form a cycloalkyl group. In another embodiment, R1 and R2 form a cyclohexyl group.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is from about 0 to about 5. In another embodiment, k is from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, $Ar_1$ and/or $Ar_2$ may be phenyl, naphthyl or biphenyl. In another embodiment, $Ar_1$ and/or $Ar_2$ may be a substituted $C_3$-$C_{30}$ aryl group. In another embodiment, $Ar_1$ and/or $Ar_2$ is a $C_3$-$C_{30}$ aryl group, such as phenyl, naphthyl or biphenyl, substituted with one or more members selected from the group consisting of $C_1$-$C_{12}$ alkyl, $C_3$-$C_{30}$ aryl, a nitro group and combinations thereof.

In one embodiment, the dihydroxyaromatic compound having amide functionality is diphenolic morpholinamide or 2,2-bis(4-hydroxyphenyl)-1-propaneamide.

The dihydroxyaromatic compounds having amide functionality may be prepared by any conventional manner, such as described in U.S. Pat. No. 3,251,806, which is incorporated herein by reference. In one embodiment, the dihydroxyaromatic compound is prepared by heating an ammonium salt of a parent diphenolic acid compound with a secondary amine.

In one embodiment, the dihaloaromatic sulfone or dinitroaromatic sulfone has formula VI:

wherein X is a halogen or nitro group;

$R^4$, $R^5$, $R^6$ and $R^7$ are each, independently, a nitro group, $C_1$-$C_{12}$ alkyl, $C_3$-$C_{30}$ aryl or a combination thereof, m and n are each, independently, 0 or 1; and b, c, d and e are each, independently, 0, 1, 2, 3 or 4.

In one embodiment, X is a halogen. In another embodiment, X may be chlorine, bromine or fluorine.

In one embodiment, $R^4$, $R^5$, $R^6$ and/or $R^7$ is methyl, ethyl, propyl, isopropyl, butyl, hexyl, heptyl, octyl, 4-methylpent-1-yl, phenyl, naphthyl or biphenyl.

In another embodiment, b, c, d and/or e are 0. In another embodiment, b, c, d and e are 0.

Examples of the dihaloaromatic sulfone include, but are not limited to, bis(4-chlorophenyl)sulfone, bis(4-fluorophenyl)sulfone, 4,4'-bis[(4-chlorophenyl)sulfonyl]-1,1'-biphenyl or 4,4'-bis[(4-fluorophenyl)sulfonyl]-1,1'-biphenyl. Functionalized polysulfones are readily available commercially.

The dihydroxyaromatic compound having amide functionality and the dihaloaromatic sulfone or dinitroaromatic sulfone are reacted in the presence of a base, which converts the dihydroxyaromatic compound to its corresponding alkali metal salt. In one embodiment, the base is a basic salt of an alkali metal compound. Examples of basic salts include, but are not limited to, alkali metal hydroxides, such as, lithium hydroxide, sodium hydroxide, potassium hydroxide, rubidium hydroxide and cesium hydroxide; alkali metal carbonates, such as, lithium carbonate, sodium carbonate, potassium carbonate, rubidium carbonate, and cesium carbonate; and alkali metal hydrogen carbonates, such as, lithium hydrogen carbonate, sodium hydrogen carbonate, potassium hydrogen carbonate, rubidium hydrogen carbonate and cesium hydrogen carbonate. Combinations of these compounds may also be used to effect the reaction.

In one embodiment, the base is present in an effective amount to deprotonate the hydroxyl groups of the dihydroxy aromatic compounds. In another embodiment, the base is present in at least an equimolar amount relative to the molar equivalents of hydroxyl functionality. In another embodiment, the base is present in an excess molar amount relative to the molar equivalents of hydroxyl functionality.

In one embodiment, the reaction is conducted at a temperature ranging from about 100° C. to about 300° C. In another embodiment, the temperature is in a range from about 120° C. to about 200° C. In another embodiment, the reaction temperature is in a range from about 150° C. to about 200° C.

The reaction is conducted for a time sufficient to react the dihydroxy compound and the dihaloaromatic sulfone or dinitroaromatic sulfone. In one embodiment, the reaction is conducted for a time period ranging from about 1 hour to about 72 hours. In another embodiment, the time period ranges from about 1 hour to about 10 hours. The reaction may be carried out under ordinary pressure or pressurized conditions.

The dihaloaromatic sulfone or dinitroaromatic sulfone may be used in substantially equimolar amounts relative to the dihydroxy aromatic compound having amide functionality used in the reaction mixture. The term "substantially equimolar amounts" means a molar ratio of the dihaloaromatic sulfone or dinitroaromatic sulfone to the dihydroxy aromatic compound having amide functionality is from about 0.85 to about 1.2 moles of the dihaloaromatic sulfone or dinitroaromatic sulfone to about 1.0 mole of the dihydroxy aromatic compound. In another embodiment, the ratio is from about 0.9 to about 1.1 moles of the dihaloaromatic sulfone or dinitroaromatic sulfone to about 1.0 mole of the dihydroxy aromatic compound having amide functionality and from about 0.98 to about 1.02 moles of the dihaloaromatic sulfone or dinitroaromatic sulfone to about 1.0 mole of the dihydroxy aromatic compound having amide functionality.

The membrane may be a hollow fiber or in a flat sheet or in a nanofiber mat configuration. The membrane may be fabricated into symmetric or asymmetric configurations.

The membranes may be made by processes known in the art. Several techniques for membrane formation are known in the art, some of which include, but are not limited to, dry-phase separation membrane formation process in which a dissolved polymer is precipitated by evaporation of a sufficient amount of solvent to form a membrane structure; wet-phase separation membrane formation process in which a dissolved polymer is precipitated by immersion in a nonsolvent bath to form a membrane structure; dry-wet phase separation membrane formation process, which is a combination of the dry and the wet-phase formation processes; thermally-induced phase-separation membrane formation process in which a dissolved polymer is precipitated or coagulated by controlled cooling to form a membrane structure. After the formation of a membrane, it may be subjected to a membrane conditioning process or a pretreatment process prior to its use in a separation application. Representative processes may include thermal annealing to relieve stresses or pre-equilibration in a solution similar to the feed stream the membrane will contact.

In one embodiment, the membranes may be prepared by phase inversion. The phase inversion process includes 1) vapor-induced phase separation (VIPS), also called "dry casting" or "air casting"; 2) liquid-induced phase separation (LIPS), mostly referred to as "immersion casting" or "wet casting"; and 3) thermally induced phase separation (TIPS), frequently called "melt casting". The phase inversion process can produce integrally skinned asymmetric membranes. Alternatively, the porous polyarylether having amide functionality can be used as a support for a thin film membrane ideally cast or interfacially polymerized onto its surface.

For the phase inversion process, the polyarylether having amide functionality may be dissolved in a solvent, such as antisolvents or polar aprotic solvents, which are defined above. In one embodiment, the polar aprotic solvent may be N,N-dimethylformamide, N,N-dimethylacetamide or 1-methyl-2-pyrrolidinone. In one embodiment, the antisolvent compounds may be water, alcohols, such as methanol, ethanol, isopropanol or diethylene glycol, or ketones, such as acetone, methylethylketone or isobutyl ketone. Both the polar aprotic solvent and anti-solvent may be used as binary or ternary systems in combination with other solvents, antisolvents or additional polymers, such as hydrophilic polymers (e.g., polyvinylpyrrollidinone or polyethylene glycol), which effect the morphology of the phase inverted membrane. The morphology can be dictated by the type, amount and molecular weight of the polyarylether having amide functionality.

The membranes may be crosslinked to provide additional support. The membranes may be crosslinked by incorporating a hollow fiber membrane into a module, filled with an aqueous solution in which 100 to 1,000 ppm of sodium disulfite and 50 to 500 ppm sodium carbonate are dissolved, and irradiated with gamma rays. The dose of gamma rays is set appropriately taking the objective degree of cross-linking into consideration. In one embodiment, a dose of gamma rays is in the range of about 10 kGy to about 100 kGy.

The membrane may be designed to have specific pore sizes so that solutes having sizes greater than the pore sizes may not be able to pass through. A pore size refers to the radius of the pores in the active layer of the membrane. In one embodiment, the pore size ranges from about 0.5 nm to about 100 nm. In another embodiment, the pore size ranges from about 4 nm to about 50 nm. In another embodiment, the pore size ranges from about 4 nm to about 25 nm. In another embodiment, the pore size ranges from about 4 nm to about 15 nm. In another embodiment, the pore size ranges from about 5.5 nm to about 9.5 nm.

In one embodiment, the polyarylether having amide functionality may be a homopolymer or a copolymer. In one embodiment, the membrane comprises a polyarylether having amide functionality is a homopolymer comprising units from structure I. In another embodiment, the membrane comprises a polyarylether having amide functionality is a homopolymer comprising units from structure II.

In another embodiment, the membrane comprises a copolymer having amide functionality. The copolymer may be random, block or graft. In one embodiment, the copolymer may be branched or hyperbranched. In one embodiment, a membrane comprises a polyarylether copolymer having amide functionality comprising (A) units from at least one of structure I or structure II:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

k is from about 0 to about 10;

Y is hydrogen, $C_1$-$C_{20}$ alkyl or $C_3$-$C_{30}$ aryl;

a, b, c, d, e and f are each, independently, 0, 1, 2, 3 or 4; and m and n are each, independently, 0 or 1; and (B) units from an aromatic ether compound.

In one embodiment, R1 and/or R2 may be methyl, ethyl, propyl, isopropyl, butyl, hexyl, heptyl, octyl, 4-methylpent-1-yl, phenyl, naphthyl or biphenyl. In another embodiment, R1 and R2 are covalently connected to form a cyclic moiety. In one embodiment, R1 and R2 form a cycloalkyl group. In another embodiment, R1 and R2 form a cyclohexyl group.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluoride, chloride, bromide or iodide.

In one embodiment, k is from about 0 to about 5. In another embodiment, k is from about 1 to about 3.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In one embodiment, Y may be methyl, ethyl, propyl, isopropyl, butyl, hexyl, heptyl, octyl, 4-methylpent-1-yl, phenyl, naphthyl or biphenyl.

The aromatic ether is any aromatic ether suitable for copolymerizing with the polyarylether having amide functionality. In one embodiment, the aromatic ether comprises units from formula IX or X:

wherein $R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof, Y and R' are each, independently, hydrogen, $C_1$-$C_{20}$ alkyl or $C_3$-$C_{30}$ aryl;

a, b, c, d, e and f are each, independently, 0, 1, 2, 3 or 4; and m and n are each, independently, 0 or 1.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In one embodiment, Y may be methyl, ethyl, propyl, isopropyl, butyl, hexyl, heptyl, octyl, 4-methylpent-1-yl, phenyl, naphthyl or biphenyl.

In one embodiment, R' may be methyl, ethyl, propyl, isopropyl, butyl, hexyl, heptyl, octyl, 4-methylpent-1-yl, phenyl, naphthyl or biphenyl.

The aromatic ether may be prepared by reacting a dihydroxyaromatic compound with a dihaloaromatic sulfone or a dinitroaromatic sulfone in the presence of a base and is prepared in situ with the reaction of the polyarylether having amide functionality.

The dihaloaromatic sulfone or dinitroaromatic sulfone and base are described above. Examples of dihydroxyaromatic compounds include, but are not limited to, bis(4-hydroxyphenyl)sulfide, bis(4-hydroxyphenyl)ether, bis(4-hydroxyphenyl)sulfone, bis(4-hydroxyphenyl)sulfoxide, 4,4'-(phenylphosphinyl)diphenol, 5-cyano-1,3-dihydroxybenzene, 4-cyano-1,3-dihydroxybenzene, 2-cyano-1,4-dihydroxybenzene, 2-methoxyhydroquinone, 2,2'-dimethylbiphenol, 2,2',6,6'-tetramethylbiphenol, 2,2',3,3',6,6'-hexamethylbiphenol, 3,3',5,5'-tetrabromo-2,2',6,6'-tetramethylbiphenol, 2,2-bis(4-hydroxyphenyl)hexafluoropropane, 4,4'-(3,3,5-trimethylcyclohexylidene)diphenol, 1,1-bis(4-hydroxy-3-methylphenyl)cyclohexane, 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,2-bis(4-hydroxyphenyl)ethane, 1,1-bis(4-hydroxy-2-chlorophenyl)ethane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,2-bis(4-hydroxyphenyl)butane, 2,2-bis(4-hydroxyphenyl)-2-methylbutane, 1,1-bis(4-hydroxyphenyl)cyclohexane, 2-(3-methyl-4-hydroxyphenyl-2-(4-hydroxyphenyl)propane, 2-(3,5-dimethyl-4-hydroxyphenyl)-2-(4-hydroxyphenyl)propane, 2-(3-methyl-4-hydroxyphenyl)-2-(3,5-dimethyl-4-hydroxyphenyl)propane, bis(3,5-dimethylphenyl-4-hydroxyphenyl)methane, 1,1-bis(3,5-dimethylphenyl-4-hydroxyphenyl)ethane, 2,2-bis(3,5-dimethylphenyl-4-hydroxyphenyl)propane, 2,4-bis(3,5-dimethylphenyl-4-hydroxyphenyl)-2-methylbutane, 3,3-bis(3,5-dimethylphenyl-4-hydroxyphenyl)pentane, 1,1-bis(3,5-dimethylphenyl-4-hydroxyphenyl)cyclopentane, 1,1-bis(3,5-dimethylphenyl-4-hydroxyphenyl)cyclohexane, bis(3,5-dimethyl-4-hydroxyphenyl)sulfoxide, bis(3,5-dimethyl-4-hydroxyphenyl)sulfone, bis(3,5-dimethylphenyl-4-hydroxyphenyl)sulfide, 2-carbamoylhydroquinone, 2,3-dicarbamoylhydroquinone, 2,2-bis(4-hydroxyphenyl) propane (bisphenol-A), resorcinol, catechol, hydroquinone, 2,6-dihydroxy naphthalene, 2,7-dihydroxynapthalene, 2,4'-dihydroxyphenyl sulfoxide, 2-diphenylphosphinylhydroquinone, bis(2,6-dimethylphenol) 2,2'-biphenol, 4,4'-biphenol, 4,4'-bis(3,5-dimethyl)biphenol, 4,4'-bis(2,3,5-trimethyl) biphenol, 4,4'-bis(2,3,5,6-tetramethyl)biphenol, 4,4'-bis(3-bromo-2,6-dimethyl)biphenol, 4,4'-isopropylidenebis(2,6-dibromophenol) (tetrabromobisphenol A), 4,4'-isopropylidenebis(2,6-dimethylphenol) (tetramethylbisphenol A), 4,4'-isopropylidenebis(2-methylphenol), 4,4'-isopropylidenebis(2-allylphenol), 4,4'-isopropylidenebis(2-allyl-6-methylphenol), 4,4'-isopropylidene-bis(2-phenylphenol), 4,4'(1,3-phenylenediisopropylidene)bisphenol (bisphenol M), 4,4'-(1,4-phenylenediisoproylidene)bisphenol (bisphenol P), 4,4'-sufonylbis(2,6-dimethylphenol), 4,4'-hexafluoroisoproylidene)bisphenol (Bisphenol AF), 4,4'-hexafluoroisopropylidene) bis(2,6-dimethylphenol), 4,4'(1-phenylethylidene)bisphenol (Bisphenol AP), 4,4'-(1-phenylethylidene) bis(2,6-dimethylphenol), 3,3-(4-hydroxyphenyl)pentane, bis (4-hydroxyphenyl)-2,2-dichloroethylene (Bisphenol C), bis (2,6-dimethyl-4-hydroxyphenyl)methane, 4,4'-(cyclopentylidene)diphenol, 4,4'-(cyclohexylidene)bis(2-methylphenol), 4,4'-bis(4-hydroxyphenyl)diphenyl ether, 9,9-bis(3-methyl-4-hydroxyphenyl)fluorene, N-phenyl-3,3-bis-(4-hydroxyphenyl)phthalimide, 4,4'-(cyclododecylidene)diphenol, 4,4'-(bicyclo[2.2.1]heptylidene)diphenol, 4,4'-(9H-fluorene-9,9-diyl)diphenol, 3,3-bis(4-hydroxyphenyl)isobenzofuran-1 (3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis (2,6-dimethyl phenol), dicyclopentadienyl bis(2-methylphenol) or dicyclopentadienyl bisphenol.

In one embodiment, the copolymer may comprise aromatic ether units from about 10 mole percent to about 90 mole percent. In another embodiment, the aromatic ether units are present from about 20 mole percent to about 80 mole percent. In another embodiment, the aromatic ether units are present from about 40 mole percent to about 60 mole percent. In one embodiment, the copolymer may comprise polyarylether units having amide functionality from about 10 mole percent to about 90 mole percent. In another embodiment, the polyarylether units having amide functionality are present from about 20 mole percent to about 80 mole percent. In another embodiment, the polyarylether units having amide functionality are present from about 40 mole percent to about 60 mole percent.

Polyarylether copolymers having amide functionality have a high glass transition temperature ranging from about 120° C. to about 280° C. in one embodiment, and ranging from about 140° C. to about 250° C. in another embodiment. In another embodiment, the $T_g$ ranges from about 140° to about 225° C. and in another embodiment, the $T_g$ ranges from about 175° C. to about 225° C.

The polyarylether copolymer having amide functionality has a molecular weight $M_n$ in the range from about 10,000 g/mol to about 1,000,000 g/mol. In another embodiment, the $M_n$ ranges from about 15,000 g/mol to about 200,000 g/mol. In another embodiment, the $M_n$ ranges from about 20,000 g/mol to about 100,000 g/mol. In another embodiment, the $M_n$ ranges from about 40,000 g/mol to about 80,000 g/mol.

In one embodiment, the $M_w$ of the polymer may be in the range from about 10,000 g/mol to about 5,000,000 g/mol. In another embodiment, the $M_w$ ranges from about 15,000 g/mol to about 1,000,000 g/mol. In another embodiment, the $M_w$ ranges from about 20,000 g/mol to about 500,000 g/mol. In another embodiment, the $M_n$ ranges from about 40,000 g/mol to about 400,000 g/mol.

In one embodiment, a polyarylether copolymer having amide functionality is prepared by reacting a dihydroxyaromatic compound, a dihydroxyaromatic compound having amide functionality and a dihaloaromatic sulfone or a dinitroaromatic sulfone in the presence of a base. The dihydroxyaromatic compound, the dihydroxyaromatic compound having amide functionality, the dihaloaromatic sulfone or dinitroaromatic sulfone and the base are described above.

In one embodiment, the dihaloaromatic sulfone or dinitroaromatic sulfone may be used in substantially equimolar amounts relative to the total amount of dihydroxy aromatic compounds (including both the dihydroxyaromatic compounds and the dihydroxyaromatic compounds having amide functionality) used in the reaction mixture. The term "substantially equimolar amounts" means a molar ratio of the dihaloaromatic sulfone or the dinitroaromatic sulfone to the total dihydroxyaromatic compounds is from about 0.85 to about 1.2 moles of the dihaloaromatic sulfone or dinitroaromatic sulfone per mole of the total dihydroxyaromatic compounds. In another embodiment, the ratio is from about 0.9 to about 1.1 moles of the dihaloaromatic sulfone or dinitroaromatic sulfone per mole of the total dihydroxyaromatic compounds and from about 0.98 to about 1.02 moles of the dihaloaromatic sulfone or dinitroaromatic sulfone per mole of the total dihydroxyaromatic compounds.

The amount of base is the amount needed to deprotonate the hydroxyl groups of the dihydroxyaromatic compounds and the dihydroxyaromatic compounds having amide functionality. In one embodiment, the base is present in at least an equimolar amount relative to the molar equivalents of hydroxyl functionality. In another embodiment, the base is present in an excess amount relative to the molar equivalents of hydroxyl functionality.

In one embodiment, the reaction is conducted at a temperature ranging from about 100° C. to about 300° C. In another embodiment, the temperature is in a range from about 120° C. to about 200° C. In another embodiment, the reaction temperature is in a range from about 150° C. to about 200° C.

The reaction is conducted for a time sufficient to react the dihydroxy compound and the dihaloaromatic or dinitroaromatic compound. In one embodiment, the reaction is conducted for a time period ranging from about 1 hour to about 72 hours. In another embodiment, the time period ranges from about 1 hour to about 10 hours. The reaction may be carried out under ordinary pressure or pressurized conditions.

In one embodiment, the polyarylether having amide functionality is a block copolymer. In one embodiment, a membrane comprises a polyarylether block copolymer comprising (A) units from at least one of structure I or structure II:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1.

(B) units from a polymer.

In one embodiment, R1 and/or R2 may be methyl, ethyl, propyl, isopropyl, butyl, hexyl, heptyl, octyl, 4-methylpent-1-yl, phenyl, furanyl, thienyl, naphthyl or biphenyl. In another embodiment, R1 and R2 are covalently connected to form a cyclic moiety. In one embodiment, R1 and R2 form a cycloalkyl group. In another embodiment, R1 and R2 form a cyclohexyl group.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is from about 0 to about 5. In another embodiment, k is from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In one embodiment, the polyarylether block copolymer having amide functionality has (A) the units of structure III:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl; and k is from about 0 to about 10; and (B) units from a polymer.

In one embodiment, R1 and/or R2 may be methyl, ethyl, propyl, isopropyl, butyl, hexyl, heptyl, octyl, 4-methylpent-1-yl, phenyl, naphthyl or biphenyl. In another embodiment, R1 and R2 are covalently connected to form a cyclic moiety. In one embodiment, R1 and R2 form a cycloalkyl group. In another embodiment, R1 and R2 form a cyclohexyl group.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is from about 0 to about 5. In another embodiment, k is from about 1 to about 3.

In one embodiment, the block copolymer may comprise from about 1 percent by weight to about 99 percent by weight of polyarylether units having amide functionality. In another embodiment, the block copolymer has from about 50 percent by weight to about 90 percent by weight of polyarylether units having amide functionality. In another embodiment, the block copolymer may comprise polymer units from about 1 percent by weight to about 99 percent by weight. In another embodiment, the polymer units are present from about 10 percent by weight to about 50 percent by weight.

The polymer is any polymer suitable for polymerizing with the polyarylether having amide functionality. In one embodiment, the polymer comprises units from formula IX or X:

wherein $R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y and R' are each, independently, hydrogen, $C_1$-$C_{20}$ alkyl or $C_3$-$C_{30}$ aryl;

a, b, c, d, e and f are each, independently, 0, 1, 2, 3 or 4; and m and n are each, independently, 0 or 1.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In one embodiment, Y may be methyl, ethyl, propyl, isopropyl, butyl, hexyl, heptyl, octyl, 4-methylpent-1-yl, phenyl, naphthyl or biphenyl.

In one embodiment, R' may be methyl, ethyl, propyl, isopropyl, butyl, hexyl, heptyl, octyl, 4-methylpent-1-yl, phenyl, naphthyl or biphenyl.

In one embodiment, the polymer is prepared by reacting a dihydroxyaromatic compound with a dihaloaromatic sulfone or dinitroaromatic sulfone in the presence of a base. The dihydroxyaromatic compound, dihaloaromatic sulfone or dinitroaromatic sulfone and base are described above.

The amount of base is the amount needed to deprotonate the hydroxyl groups of the dihydroxy aromatic compounds. In one embodiment, the base is present in at least an equimolar amount relative to the molar equivalents of hydroxyl functionality. In another embodiment, the base is present in an excess amount relative to the molar equivalents of hydroxyl functionality.

The dihaloaromatic sulfone or dinitroaromatic sulfone may be used in substantially equimolar amounts relative to the dihydroxy aromatic compound. The term "substantially equimolar amounts" means a molar ratio of the dihaloaromatic sulfone or dinitroaromatic sulfone to the dihydroxy aromatic compounds is from about 0.85 to about 1.2 moles of the dihaloaromatic sulfone or dinitroaromatic sulfone to about 1.0 mole of the dihydroxy aromatic compound. In another embodiment, the ratio is from about 0.9 to about 1.1 moles of the dihaloaromatic sulfone or dinitroaromatic sulfone to about 1.0 mole of the dihydroxy aromatic compound and from about 0.98 to about 1.02 moles of the dihaloaromatic sulfone or dinitroaromatic sulfone to about 1.0 mole of the dihydroxy aromatic compound.

In one embodiment, the reaction to prepare the polymer is conducted at a temperature ranging from about 100° C. to about 300° C. In another embodiment, the temperature is in a range from about 120° C. to about 200° C. In another embodiment, the reaction temperature is in a range from about 150° C. to about 200° C.

The reaction to prepare the polymer is conducted for a time sufficient to react the dihydroxyaromatic compound and the dihaloaromatic or dinitroaromatic compound. In one embodiment, the reaction is conducted for a time period ranging from about 1 hour to about 72 hours. In another embodiment, the time period ranges from about 1 hour to about 10 hours. The reaction may be carried out under ordinary pressure or pressurized conditions. The polyarylether block copolymers having amide functionality are hydrophilic, but are not water soluble.

The block copolymers may be linear, branched or hyperbranched. They are solvent resistant with a high glass transition temperature. In one embodiment, the glass transition temperature, $T_g$, of the polymer ranges from about 120° C. to about 280° C. In another embodiment, the polymer ranges from about 140° C. to about 250° C. In another embodiment, the $T_g$ ranges from about 140° to about 225° C., including from about 175° C. to about 225° C.

The polyaryletheramide block copolymer may be characterized by number average molecular weight ($M_n$) and weight average molecular weight ($M_w$). The various average molecular weights $M_n$ and $M_w$ are determined by techniques, such as gel permeation chromatography, and are known to those skilled in the art. In one embodiment, the $M_n$ of the polymer may be in the range from about 10,000 g/mol to about 1,000,000 g/mol. In another embodiment, the $M_n$ ranges from about 15,000 g/mol to about 200,000 g/mol. In another embodiment, the $M_n$ ranges from about 20,000 g/mol to about 100,000 g/mol. In another embodiment, the $M_n$ ranges from about 40,000 g/mol to about 80,000 g/mol.

In one embodiment, the $M_w$ of the polymer is in the range from about 10,000 g/mol to about 5,000,000 g/mol. In another embodiment, the $M_w$ ranges from about 15,000 g/mol to about 1,000,000 g/mol. In another embodiment, the $M_w$ ranges from about 20,000 g/mol to about 500,000 g/mol. In another embodiment, the $M_n$ ranges from about 40,000 g/mol to about 400,000 g/mol.

The polyarylether block copolymer having amide functionality may be prepared by reacting a dihydroxyaromatic compound having amide functionality with a dihaloaromatic sulfone or a dinitroaromatic sulfone in the presence of a base to form a polyarylether having amide functionality and copolymerizing the polyarylether having amide functionality with a polymer to form the block copolymer.

The dihydroxyaromatic compounds having amide functionality, the dihaloaromatic sulfone or dinitroaromatic sulfone, base and polymer are described above. In one embodiment, the base is present in an effective amount to deprotonate the hydroxyl groups of the dihydroxy aromatic compounds. In another embodiment, the base is present in at least an equimolar amount relative to the molar equivalents of hydroxyl functionality. In another embodiment, the base is present in an excess amount relative to the molar equivalents of hydroxyl functionality. The dihaloaromatic sulfone or the dinitroaromatic sulfone may be used in substantially equimolar amounts relative to the dihydroxy aromatic compounds used in the reaction mixture. The term "substantially equimolar amounts" means a molar ratio of the dihaloaromatic sulfone or dinitroaromatic sulfone to the dihydroxy aromatic compounds having amide functionality is from about 0.85 to about 1.2 moles of the dihaloaromatic sulfone or dinitroaromatic sulfone to about 1.0 mole of the dihydroxy aromatic compound. In another embodiment, the ratio is from about 0.9 to about 1.1 moles of the dihaloaromatic sulfone or dinitroaromatic sulfone to about 1.0 mole of the dihydroxy aromatic compound and from about 0.98 to about 1.02 moles of the dihaloaromatic sulfone or dinitroaromatic sulfone to about 1.0 mole of the dihydroxy aromatic compound.

In one embodiment, the dihydroxyaromatic compound having amide functionality and the dihaloaromatic sulfone or dinitroaromatic sulfone are reacted at a temperature ranging from about 100° C. to about 300° C. In another embodiment, the temperature is in a range from about 120° C. to about 200° C. In another embodiment, the reaction temperature is in a range from about 150° C. to about 200° C.

The reaction is conducted for a time sufficient to react the dihydroxy compound and the dihaloaromatic sulfone or the dinitroaromatic sulfone. In one embodiment, the reaction is conducted for a time period ranging from about 1 hour to about 72 hours. In another embodiment, the time period ranges from about 1 hour to about 10 hours. The reaction may be carried out under ordinary pressure or pressurized conditions.

The polymer is added to the reaction mixture and is polymerized with the polyarylether having amide functionality. In one embodiment, the polyarylether having amide functionality and polymer are reacted at a temperature ranging from about 100° C. to about 300° C. In another embodiment, the temperature is in a range from about 120° C. to about 200° C. In another embodiment, the reaction temperature is in a range from about 150° C. to about 200° C.

The reaction is conducted for a time sufficient to react the polyarylether having amide functionality and the polymer. In one embodiment, the reaction is conducted for a time period ranging from about 1 hour to about 72 hours. In another embodiment, the time period ranges from about 1 hour to about 10 hours. The reaction may be carried out under ordinary pressure or pressurized conditions.

In one embodiment, the membrane comprises a blend comprising a polyarylether having amide functionality and at least one resin. The selection of the resin imparts different properties to the blend, such as better heat resistance, biocompatibility, and the like. In one embodiment, the membrane comprises a blend comprising a polyarylether having amide functionality and one or more resins, the polyarylether having amide functionality comprises units from at least one of structure I or structure II:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1.

In one embodiment, R1 and/or R2 may be methyl, ethyl, propyl, isopropyl, butyl, hexyl, heptyl, octyl, 4-methylpent-1-yl, phenyl, furanyl, thienyl, naphthyl or biphenyl. In another embodiment, R1 and R2 are covalently connected to form a cyclic moiety. In one embodiment, R1 and R2 form a cycloalkyl group. In another embodiment, R1 and R2 form a cyclohexyl group.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is in a range of from about 0 to about 5. In another embodiment, k is in a range of from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In one embodiment, the polyarylether having amide functionality in the blend is a homopolymer as described above. In another embodiment, the polyarylether having amide functionality is a copolymer as described above. In another embodiment, the polyarylether is a block copolymer as described above.

The resin may be hydrophilic or hydrophobic in nature. Examples of resins that may be blended with the polyarylether having amide functionality include polysulfone, polyether sulfone, polyether urethane, polyphenylene sulfone, polyamide, polyether-amide, polyacrylonitrile, polyvinylpyrrolidone (PVP), polyoxazoline, polyethyleneglycol, polypropylene glycol, polyglycolmonoester, copolymers of polyethyleneglycol with polypropylene glycol, water-soluble cellulose derivatives, polysorbate, polyethylene-polypropylene oxide copolymers or polyethyleneimines.

In one embodiment, the blend comprises from about 20 to about 99 percent by weight polyarylether having amide functionality and from about 1 to about 80 percent by weight of a resin, based on the weight of the blend. In another embodiment, the blend comprises from about 50 to about 97.5 percent by weight polyarylether having amide functionality and from about 2.5 to about 50 percent by weight of the resin, based on the weight of the blend. In another embodiment, the blend comprises from about 75 to about 95 percent by weight polyarylether having amide functionality and from about 5 to about 25 percent by weight of the resin, based on the weight of the blend.

In one embodiment, the resin is PVP. PVP is a polymer easily dissolved in water and, in general, PVP is easily eluted with water or blood from a membrane, such as a hollow fiber membrane. PVP can be insolubilized by cross-linking. When the PVP contained is completely insolubilized, the elution from the hollow fiber membrane is completely stopped, but the effect of making the membrane surface hydrophilic is also diminished. In one embodiment, only a portion of PVP is insolubilized by cross-linking so that the amount of water-soluble PVP becomes 5 to 50% of the total amount of PVP contained in the hollow fiber membrane. In this range, the elution from the hollow fiber membrane is inhibited and the effect of making the membrane surface hydrophilic is also sufficiently maintained.

PVP may be crosslinked by known methods. U.S. Pat. Nos. 6,432,309 and 5,543,465, incorporated herein by reference, disclose methods for crosslinking PVP. Some exemplary methods of crosslinking include, but are not limited to, exposing it to heat, radiation, such as X-rays, alpha rays, beta rays, gamma rays, ultraviolet rays, visible radiation, infrared radiation, electron beams, or by chemical methods such as, but not limited to, treating PVP with a crosslinker, such as potassium peroxodisulfate or ammonium peroxopersulfate, at temperatures ranging from about 20° C. to about 80° C. in an aqueous medium at pH ranges from about 4 to about 9, and for a time period ranging from about 5 minutes to about 60 minutes.

PVP may be obtained by polymerizing an N-vinylpyrrolidone using standard addition polymerization techniques known in the art. One polymerization procedure involves the free radical polymerization using initiators, such as azobisisobutyronitrile (AIBN), optionally, in the presence of a solvent. PVP is also commercially available under the tradenames PLASDONE® from ISP COMPANY or KOLLIDON® from BASF. Use of PVP in hollow fiber membranes is described in U.S. Pat. Nos. 6,103,117, 6,432,309, 6,432,309 and 5,543,465, which are incorporated herein by reference.

The membranes may be used for filtering aqueous media, such as hemodialysis, water separation, biopharmaceuticals separation, virus filtration and chemical separations. The membranes or membrane-like structures may also be used for gas separation and scaffolds for tissue engineering or cell culturing. In one embodiment, architectures made from these materials may mimic the structure of bone marrow and facilitate proliferation and differentiation of stem cells into specific blood cells.

In one embodiment, the membranes are hemodialysis or hemofiltration membranes. Hemodialysis and hemofiltration membranes are porous membranes permitting the passage of low molecular weight solutes, such as urea, creatinine, uric acid, electrolytes and water, while preventing the passage of higher molecular weight proteins and blood cellular elements.

In one embodiment, a hemodialysis membrane comprises a polyarylether having amide functionality comprises units from at least one of structure I or structure II:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1.

In one embodiment, R1 and/or R2 may be methyl, ethyl, propyl, isopropyl, butyl, hexyl, heptyl, octyl, 4-methylpent-1-yl, phenyl, naphthyl or biphenyl. In another embodiment, R1 and R2 are covalently connected to form a cyclic moiety. In one embodiment, R1 and R2 form a cycloalkyl group. In another embodiment, R1 and R2 form a cyclohexyl group.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is in a range of from about 0 to about 5. In another embodiment, k is in a range of from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In another embodiment, the membranes are water separation membranes and may be used for desalinating brackish and sea water, water softening, production of ultrapure water for electronics and pharmaceutical industries and industrial wastewater purification for food and beverage, electroplating and metal finishing, textiles and laundry, petroleum and petrochemical, and pulp and water industries.

In one embodiment, a water purification membrane comprises a polyarylether having amide functionality comprising units from at least one of structure I or structure II:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y is hydrogen, $C_1$-$C_{20}$ alkyl or $C_3$-$C_{30}$ aryl;

k is from about 0 to about 10;

a, b, c, d, e and f are each, independently, 0, 1, 2, 3 or 4; and m and n are each, independently, 0 or 1.

In one embodiment, R1 and/or R2 may be methyl, ethyl, propyl, isopropyl, butyl, hexyl, heptyl, octyl, 4-methylpent-1-yl, phenyl, naphthyl or biphenyl. In another embodiment, R1 and R2 are covalently connected to form a cyclic moiety. In one embodiment, R1 and R2 form a cycloalkyl group. In another embodiment, R1 and R2 form a cyclohexyl group.

In another embodiment, $R_1$ and/or $R_2$ may be a substituted $C_3$-$C_{30}$ aryl group. In one embodiment, $R_1$ and/or $R_2$ are a $C_3$-$C_{30}$ aryl, such as phenyl, naphthyl or biphenyl, substituted with one or more members selected from the group consisting of $C_1$-$C_{20}$ alkyl, $C_3$-$C_{30}$ aryl, halogen, nitrile, amide, hydroxyl, aryloxy, alkoxy, thioalkoxy, thioaryloxy, carbonyl, sulfonyl, carboxylate, carboxylic ester, sulfone, phosphonate, sulfoxide, carbamate, amine, phosphinyl, nitro, acylhydrazide, hydrazide, imide, imine, amidate, amidine, oxime, peroxide, diazo, azide, ether, ester, lactam, lactone, urea, urethane, phosphonamide, sulfonamide, alcohol, aldehyde and ketone. In one embodiment, halogen may include fluorine, chlorine, bromine or iodine.

In one embodiment, k is in a range of from about 0 to about 5. In another embodiment, k is in a range of from about 1 to about 3.

In one embodiment, Y may be methyl, ethyl, propyl, isopropyl, butyl, hexyl, heptyl, octyl, 4-methylpent-1-yl, phenyl, naphthyl or biphenyl.

In one embodiment, a, b, c, d, e and/or f are 0. In another embodiment, a, b, c, d, e and f are 0.

In one embodiment, $R^3$, $R^4$, $R^5$, $R^6$ and/or $R^7$ may be methyl, ethyl, propyl, isopropyl, butyl, hexyl, heptyl, octyl, 4-methylpent-1-yl, phenyl, naphthyl or biphenyl.

In order that those skilled in the art will be better able to practice the present disclosure, the following examples are given by way of illustration and not by way of limitation.

EXAMPLES

Example 1

Synthesis of Polysulfone-amides

Diphenolic Morpholinamide (2.843 g, 8.0 mmol) was added to a three-neck flask installed with a Dean-Stark Condenser, a dropping funnel, and a mechanical stir. $K_2CO_3$ (1.66 g, 12 mmol), N,N-dimethylacetamide (DMAc) (10 ml), and 8 ml toluene was added to the flask. The solution was heated to 155° C. to remove water and toluene by azeotropic distillation. After 2.5 hours, bis(4-fluorophenyl) sulfone (2.034 g, 8.0 mmol) was added. After 3 hours, the solution became very viscous. During cooling, 25 ml of DMAc was added to the mixture. The solution was precipitated in water and washed with water and methanol. The polymer was dried to afford 4.4 g polysulfone-amide (Mw=84,280, PDI=4.8, Tg=186° C.).

Example 2

Two membranes of polyamidesulfone were prepared by phase inversion. A 15 wt % NMP solution of the polyamidesulfone from Example 1 was prepared and cast onto a glass substrate using a 10 mil doctor blade. The glass substrate was immersed in water (antisolvent) at room temperature to produce a porous polymer film. The resulting white, opaque membranes were soaked in water for two days to remove residual solvent and dried in vacuo. Another membrane was prepared under the same conditions except that a 20 wt % NMP solution of the polyamidesulfone from Example 1 was prepared.

Figure 1:
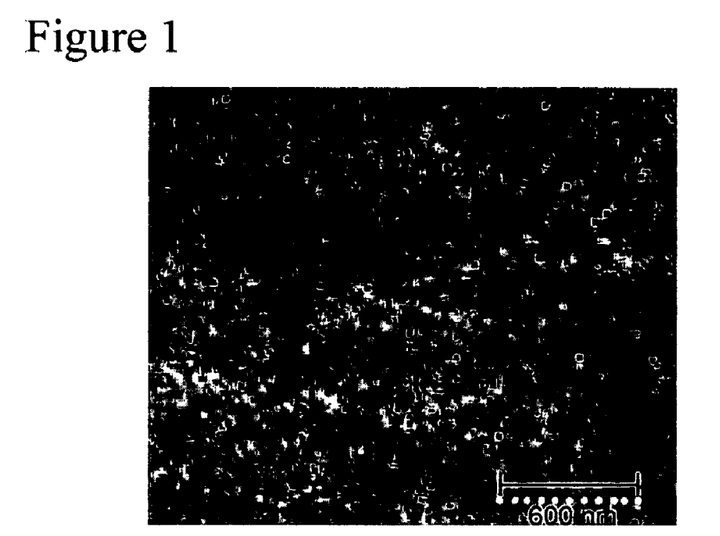
FIG. 1 is a scanning electron micrograph image (bar 620 nm) of a polyamide sulfone membrane.
Figure 2:
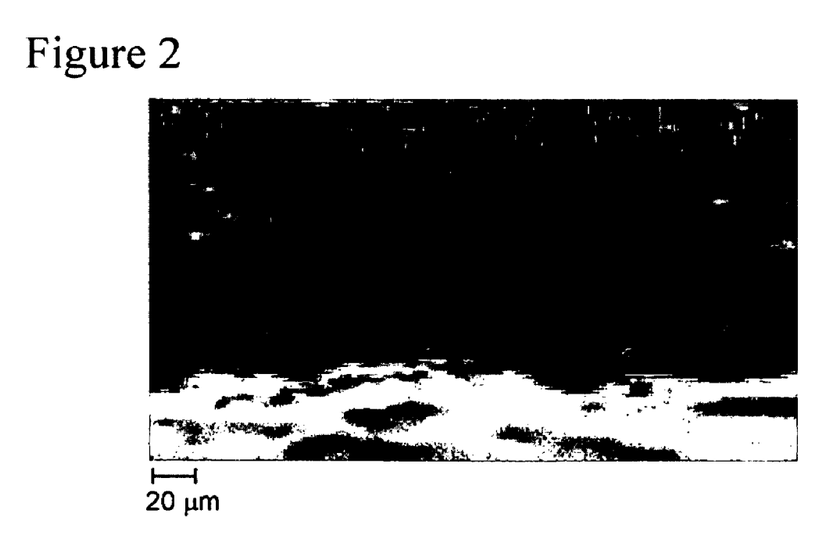
FIG. 2 is a scanning electron micrograph image (bar 20 μm) of a phase inverted polyamide sulfone membrane.

FIGS. 1 and 2 show scanning electron micrograph images of the polyamidesulfone membranes. FIG. 1 shows the upper face of the membrane prepared from the 15 wt % NMP solution of the polyamidesulfone having micron-sized pores. FIG. 2 shows a cross section of the phase inverted membrane prepared from the 20 wt % NMP solution of the polyamidesulfone.

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

The invention claimed is:

1. A membrane comprising a polyarylether having amide functionality having units from at least one of structure I or structure II:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl;

$R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

k is from about 0 to about 10;

Y is hydrogen, $C_1$-$C_{20}$ alkyl or $C_3$-$C_{30}$ aryl;

a, b, c, d, e and f are each, independently, 0, 1, 2, 3 or 4; and m and n are each, independently, 0 or 1.

2. The membrane of claim 1 wherein the polyarylether having amide functionality has the units of structure III:

wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl; and k is from about 0 to about 10.

3. The membrane of claim 1 having a glass transition temperature from about 120° C. to about 280° C.

4. The membrane of claim 1 wherein the polyarylether having amide functionality is a homopolymer.

5. The membrane of claim 1 wherein the polyarylether having amide functionality is a copolymer.

6. The membrane of claim 5 wherein the polyarylether having amide functionality further comprises units from an aromatic ether.

7. The membrane of claim 6, wherein the aromatic ether comprises units from formula IX or X:

IX

X wherein $R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y and R' are each, independently, hydrogen, $C_1$-$C_{20}$ alkyl or $C_3$-$C_{30}$ aryl;

a, b, c, d, e and f are each, independently, 0, 1, 2, 3 or 4; and m and n are each, independently, 0 or 1.

8. The membrane of claim 1 wherein the polyarylether having amide functionality is a block copolymer.

9. The membrane of claim 8 wherein the block copolymer further comprises (B) units from a polymer.

10. The membrane of claim 9 wherein the polyarylether having amide functionality comprises (A) units of structure III:

III wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_3$-$C_{30}$ aryl; and k is from about 0 to about 10.

11. The polyarylether of claim 8 having a glass transition temperature from about 120° C. to about 280° C.

12. The polyarylether of claim 8 wherein the polymer comprises units from formula IX or X:

IX

X wherein $R^3$, $R^4$, $R^5$, $R^6$, $R^7$ and $R^8$ are each, independently, a nitro group, $C_1$-$C_{12}$ alkyl, $C_3$-$C_{30}$ aryl or a combination thereof;

Y and R' are each, independently, hydrogen, $C_1$-$C_{20}$ alkyl or $C_3$-$C_{30}$ aryl;

a, b, c, d, e and f are each, independently, 0, 1, 2, 3 or 4; and m and n are each, independently, 0 or 1.

13. The membrane of claim 8 wherein the block copolymer comprises (A) from about 1 percent by weight to about 99 percent by weight of polyarylether units having amide functionality and (B) from about 1 percent by weight to about 99 percent by weight of the polymer, based on the weight of the block copolymer.

14. The membrane of claim 1 further comprising a resin.

15. The membrane of claim 14 wherein the polyarylether having amide functionality has the units of structure III:

III wherein $R_1$ and $R_2$ are separate groups or are covalently connected to form a cyclic moiety, $R_1$ and $R_2$ are each, independently, selected from the group consisting of hydrogen, $C_1$-$C_{20}$ alkyl, $C_3$-$C_{30}$ aryl and a substituted $C_{3-30}$ aryl; and k is from about 0 to about 10.

16. The membrane of claim 14 wherein the polyarylether having amide functionality is a homopolymer.

17. The membrane of claim 14 wherein the polyarylether having amide functionality is a copolymer.

18. The membrane of claim 1 wherein the membrane is a hemodialysis membrane.

19. The membrane of claim 1 wherein the membrane is a water purification membrane.

* * * * *